United States Patent [19]

Speranza et al.

[11] Patent Number: 5,118,785
[45] Date of Patent: Jun. 2, 1992

[54] PREPARATION OF POLYETHER AMIDE FROM TETRAETHYLENE GLYCOL DIAMINE AND TEREPHTHALIC ACID

[75] Inventors: George P. Speranza; Wei-Yang Su, both of Austin, Tex.

[73] Assignee: Texaco Chemical Company, White Plains, N.Y.

[21] Appl. No.: 506,988

[22] Filed: Apr. 10, 1990

[51] Int. Cl.$^5$ .............................................. C08G 69/40
[52] U.S. Cl. ...................................... 528/347; 528/335
[58] Field of Search ................................. 528/347, 335

[56] References Cited

U.S. PATENT DOCUMENTS

| | | | |
|---|---|---|---|
| 2,359,867 | 10/1944 | Martin | 260/78 |
| 3,843,609 | 10/1974 | Kimura et al. | 528/347 |
| 4,356,300 | 10/1982 | Isler et al. | 528/347 |
| 4,611,051 | 9/1986 | Hayes et al. | 528/295.3 |
| 4,617,342 | 10/1986 | Poppe et al. | 524/606 |
| 4,656,242 | 4/1987 | Swan et al. | 528/295.3 |

FOREIGN PATENT DOCUMENTS 0313861  5/1989  European Pat. Off. ............ 528/347

OTHER PUBLICATIONS

*Chemical Abstracts,* vol. 31:769 ¶9 (1946) reporting British Patent No. 562,370.

J. R. Flesher, Jr., "Polyether Block Amide: High-Performance TPE," *Modern Plastics,* Sep., 1987, pp. 100-110.

*Primary Examiner*—Harold D. Anderson
*Attorney, Agent, or Firm*—Jack H. Park; Kenneth R. Priem; David L. Mossman

[57] ABSTRACT

Polyether amides may be produced by reacting aromatic dicarboxylic acids with tetraethylene glycol diamine. This is surprising since aromatic dicarboxylic acids, such as terephthalic acid cannot be readily reacted with triethylene glycol diamine. Suitable dicarboxylic acids include terephthalic acid, isophthalic acid, t-butyl isophthalic acid, and mixtures thereof. Tetraethylene glycol diamine is also known as JEFFAMINE ® EDR-192 Amine. The resulting polyether amides are useful to make polymers, including fibers, with unusually good water absorbancy properties.

5 Claims, No Drawings

PREPARATION OF POLYETHER AMIDE FROM TETRAETHYLENE GLYCOL DIAMINE AND TEREPHTHALIC ACID

CROSS-REFERENCES TO RELATED APPLICATIONS

This application is related to U.S. patent application Ser. No. 07/506,990, filed of even date, relating to novel polyether amides, and methods therefor, and U.S. patent application Ser. No. 07/507,261, filed of even date, relating to the reaction products from a mixture of polyethylene glycol diamines and other diamines with dicarboxylic acids.

FIELD OF THE INVENTION

The invention relates to methods for making polyamides, and, in one aspect, more particularly relates to methods for making polyether amides by reacting aromatic dicarboxylic acids with polyethylene glycol diamines.

BACKGROUND OF THE INVENTION

Triethylene and tetraethylene glycol diamines may be continuously produced from glycols catalytically. The triethylene glycol diamine and tetraethylene glycol diamine products are known under the trade names JEFFAMINE® EDR-148 Amine and JEFFAMINE® EDR-192 Amine, respectively, as made by Texaco Chemical Co. These materials are useful as epoxy curing agents.

It is, of course, known to react materials having primary amine groups, with compounds having carboxylic acid groups.

Of particular interest is U.S. Pat. No. 2,359,867 which teaches polymers having a high receptivity for acid dyes, which polymers are the reaction product of 75 to 95 parts by weight of a mixture of hexamethylenediamine and adipic acid in substantially equal proportions, and 5 to 25 parts by weight of a polyamide-forming composition selected from the class of (a) mixtures of diamine and dibasic carboxylic acid in substantially equimolecular proportions, and (b) monoaminomonocarboxylic acids. The polyamide-forming composition has a bifunctional polyamide-forming reactant containing at least one oxygen atom in the chain of atoms separating its amide-forming groups. Such polyamide forming reaction may include compounds of the formula $NH_2-(CH_2CH_2O)_x-CH_2CH_2-NH_2$, where x ranges from 2 to 3. Also of interest is S. Iwabuchi, et al., "Darstellung und Eigenschaften von Copolyamiden mit Oxyethylenegruppen in definierter Sequenz," *Makromol. Chem.*, Vol. 183, (1982) pp. 1427-1433. The summary to the article indicates that polyamides of the formula:

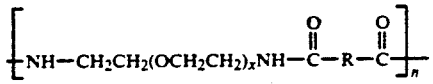

were synthesized from α,ω-diamino-substituted oligo-(oxyethylene)s and bis-chlorides of dicarboxylic acids. The copolymers contained up to five oxyethylene units per repeating unit, and properties like solubility, thermal stability and complexing ability towards alkali metal cations were influenced.

A crystalline polyamide which has improved tensile strength and which has a heat deflection temperature in excess of 240° C. when filled is formed from dicarboxylic acid compounds comprising compounds of terephthalic acid and isophthalic acid in a molar ratio of at least 80:20 to about 99:1 and diamines comprising hexamethylene diamine and trimethylhexamethylene diamine in a molar ratio of about 98:2 to about 60:40, according to U.S. Pat. No. 4,617,342.

These kinds of materials may be used for hot melt adhesives. For example, U.S. Pat. No. 4,656,242 describes that poly(ester-amide) polymers made from an acid component and a substantially equivalent amount of an amine and a diol component are suitable as hot melt adhesives for bonding plastics. The acid component has 10-80 equivalent percent of a dimer acid having about 36 carbon atoms and 40-90 equivalent percent of a linear dicarboxylic acid. The amine and diol component has from 40-90 equivalent percent of an organic diamine and 10-60 equivalent percent of a diol. Also of interest is U.S. Pat. No. 4,611,051 which teaches poly(esteramide) hot-melt adhesives prepared from condensation of a mixture of polymeric fatty acids and 1,18-octadecanedicarboxylic acid, and a substantially equivalent proportion of a mixture of a polyamine and a polyol. Suitable polyamines include ethylenediamine, 1,3-propanediamine, 1,4-butanediamine, 1,6-hexamethylene-diamine, piperazine, and 4,4'-methylene-bis-(cyclohexylamine). Appropriate diols are ethylene glycol, 1,3-propanediol, 1,4-butanediol, 1,6-hexamethylenediol, cyclohexanemethanol, polyethylene glycol and polybutylene glycol.

See also *Chemical Abstracts,* Vol. 31:769 ¶9 (1946) reporting Great Britain Patent 562,370 which describes a mixture of at least two preformed synthetic linear polyamides heated in the molten state at amide-forming temperatures until a homogeneous melt blend was obtained. At least one of the polyamides should be soluble in water and the other insoluble. The insoluble polyamide may be polyhexamethylene adipamide. The soluble polyamide may be one in which heteroatoms of oxygen or sulfur are present in the main polyamide chain, such as polytriglycol adipamide and N-methylpolytriglycol adipamide. The resultant polyamides had increased water-absorption properties and improved physical properties.

A good, general background article about some of these amide materials is J. R. Flesher, Jr., "Polyether Block Amide: High-Performance TPE," *Modern Plastics,* September, 1987, pp. 100-110, where the family of engineering-grade thermoplastic elastomers based on block copolymers of polyethers and polyamides is discussed.

Although polyamides have been incrementally improved as shown by the publications discussed above as examples, there remains a need for new polyamides having improved water absorbancy, but which retain the beneficial properties of polyamides.

SUMMARY OF THE INVENTION

Accordingly, it is an object of the present invention to provide a method for making polyether amides having improved water absorbancy, and/or which are soluble in water.

It is another object of the present invention to provide a novel method for making polyether amides made from polyethylene glycol diamines and aromatic dicarboxylic acids.

Another object of the invention to provide a method for making these materials that is easily implemented.

In carrying out these and other objects of the invention, there is provided, in one form, a method of producing a polyether amide by reacting tetraethylene glycol diamine with an aromatic dibasic acid, or an ester thereof.

DETAILED DESCRIPTION OF THE INVENTION

It has been discovered that while triethylene glycol diamine (JEFFAMINE® EDR-148 amine) cannot be reacted well with aromatic dicarboxylic acids, that surprisingly tetraethylene glycol diamine (JEFFAMINE® EDR-192 amine) may be easily and advantageously reacted with aromatic dicarboxylic acids to form polyether amides in good yield. These novel polyether amides are useful in applications where good water absorption is desired, such as fabrics, where it is known that some incorporation of moisture is useful in reducing the tendency of the fabric to carry an undesirable static charge.

The polyether amides of this invention may be made according to the reaction that may be very generally schematically represented as:

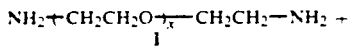

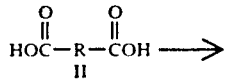

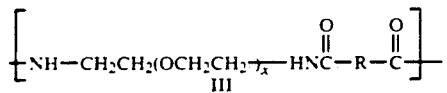

where (I) is the polyethylene glycol diamine where x ranges from 2 to 3. When x is 2 and 3, the compounds are triethylene glycol diamine (JEFFAMINE EDR-148 amine) and tetraethylene glycol diamine (JEFFAMINE EDR-192 amine), respectively. As noted, the polyether amides of this invention must use the tetraethylene glycol diamines of compound (I) where x is 3, or the reaction will proceed poorly.

Compound (II) is the dicarboxylic acid and R is an aryl moiety having from 6 to 34 carbon atoms in one embodiment, in one aspect from 6 to 20 carbon atoms, and in a further aspect from 6 to 9. In another aspect of the invention, the dicarboxylic acid may be selected from the group including, but not necessarily limited to, terephthalic acid, isophthalic acid, t-butyl isophthalic acid and mixtures thereof. The esters of these acids may also be used.

The polyether amides are represented as compound (III) where R and x have the meanings given above. The polyether amides may be made directly by contacting at least one mole of the tetraethylene glycol diamine for every mole of aromatic dicarboxylic acid in the presence of heat, from approximately 220° to about 300° C. as a narrower range, where a broad temperature range for this reaction is from about 250° to about 280° C. No catalyst is required for this reaction, although one may be yet discovered that might prove beneficial. The reaction may also be conducted at atmospheric pressure. The reaction is quite selective yielding the polyether amides in nearly quantitative yield. The products are generally light-colored solids. The products and methods of this invention will be described in more detail with reference to the following examples.

As mentioned, it has been surprisingly discovered that polyether amides of the invention cannot be produced by the reaction of triethylene glycol diamine with terephthalic acid, which does not proceed well when pursued directly. This fact is true even though triethylene glycol diamine reacts well with aliphatic dicarboxylic acids. However, it has been discovered that tetraethylene glycol diamine can be easily reacted with aromatic diacids. The reaction of tetraethylene glycol diamine with terephthalic acid may be represented as follows:

$H_2N(CH_2CH_2O)_3CH_2CH_2NH_2 +$

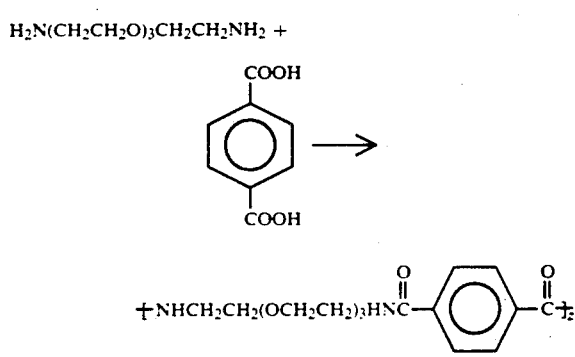

The following examples will illustrate how the polyether amides of the present invention may be prepared by forming the stoichiometric 1:1 salts of the polyethylene glycol diamine/dicarboxylic acid pairs and then performing the step-reaction (condensation) by heating to remove the water.

EXAMPLES 1-5

Reactions with Terephthalic Acid

Terephthalic acid is one of the most important dibasic acids in the polymer industry. It provides stability and toughness to the polymer. It has been discovered that advanced polyamides based on terephthalic acid having good water absorbent properties may be produced. The resulting polyamides show increasing tendency for water solubility. It is clear that when increasing the amount of polyoxyethylene units of polyamides, the products show an increasing tendency to dissolve faster in water.

Attempts were made to prepare polyamides from the salt of terephthalic acid and JEFFAMINE EDR-148 amine. No desired polyamide was observed in the reaction. It is possible that the melting points of the resulting amides and salts in the early stages are very high and the polymerization is then essentially stopped due to the result of solid phase reaction. Indeed, the product tends to decompose under the polymerization set-up if the reaction temperature is too high.

Adding more ether linkages reduces polymer crystallinity and, therefore, lowers its melting temperature. Hence, polymerization was carried out to produce polyamide from the salt of JEFFAMINE EDR-192 amine and terephthalic acid. A tough polymer was obtained. It absorbed water and could be drawn into fibers. In addition, a good product was also obtained when JEFFAMINE EDR-192 amine was reacted directly with a stoichiometric amount of terephthalic acid.

EXAMPLE 1

Reaction of JEFFAMINE EDR-148 Amine.Terephthalic Acid Salt

To a test tube was added 4.0 g. of JEFFAMINE EDR-148 amine.terephthalic acid salt. The test tube was placed into a glass reactor equipped with a nitrogen purging tube. The reactor was heated to 170° C. for one hour and then 260° C. for four hours. An off-white, very brittle solid was recovered. This result indicated that a very low molecular weight polyamide was obtained.

EXAMPLE 2

Reaction of JEFFAMINE EDR-148 Amine.Terephthalic Acid Salt

The procedure of Example 1 was followed, except that the reactor was heated to 280° C. for five hours. A dark-brown, brittle solid was obtained. This result indicated that the polyamide decomposed at 280° C.

EXAMPLE 3

Reaction of JEFFAMINE EDR-148 Amine.Terephthalic Acid Salt

The procedure of Example 1 was followed, except that 3.5 g. of JEFFAMINE EDR-148 amine.terephthalic acid salt and 3.5 g. of water were used. A light-yellow, brittle solid was recovered (m.p. 270° C.). The product showed very good thermostability by thermal gravimetric analysis in which 1% weight loss was found at 350° C. The result suggests that more stable polyamides might be obtained if the polymerization is carried out in water.

EXAMPLE 4

Reaction of JEFFAMINE EDR-192 Amine.Terephthalic Acid Salt

The procedure of Example 1 was followed, except that 2.3 g. of JEFFAMINE EDR-192 amine.terephthalic acid salt and 5.0 g. of water were used, and the polyamide was later heated to 250° C./0.1 mmHg for five hours. A light-yellow, tough polymer (m.p. 273° C.) was obtained. The product showed good thermostability (2.5% weight loss at 400° C.) and swelled in water.

EXAMPLE 5

Reaction of JEFFAMINE EDR-192 Amine.Terephthalic Acid Salt

The procedure of Example 1 was followed, except that 1.771 g. of JEFFAMINE EDR-192 amine, 1.531 g. of terephthalic acid salt, 2.5 g. of water and a trace amount of hydrazine were used. A yellow, elastomeric polymer was obtained. The product showed good thermostability and was drawn into fibers. This example shows that the polyamide can be obtained by reacting JEFFAMINE EDR-192 amine directly with a stoichiometric amount of terephthalic acid in water.

Many modifications may be made in the process of this invention without departing from the spirit and scope thereof which are defined only in the appended claims. For example, one skilled in the art may discover that particular reaction conditions, sequences, etc. which may not be explicity recited herein, but which are nevertheless anticipated, would give optimal or otherwise desirable results.

We claim:
1. A method of producing a polyether amide by reacting tetraethylene glycol diamine with terephthalic acid or an ester thereof.
2. The method of claim 1 where the reacting is conducted at a temperature between about 220° and about 300° C.
3. The method of claim 1 where the molar ratio of tetraethylene glycol diamine to the aromatic dicarboxylic acid is approximately 1:1.
4. A method for making a water-soluble polyether amide comprising the steps of:
   combining tetraethylene glycol diamine with terephthalic acid or an ester thereof, to form an equimolar salt;
   forming a polyether amide by heating the equimolar salt.
5. A method for making a water-soluble polyether amide comprising the steps of:
   combining tetraethylene glycol diamine with terephthalic acid, or an ester thereof, to form an equimolar salt;
   forming a polyether amide by heating the equimolar salt at a temperature between about 250° and about 280° C.

* * * * *